(12) United States Patent
Hong et al.

(10) Patent No.: US 6,392,666 B1
(45) Date of Patent: May 21, 2002

(54) TELEPHONE CALL CENTER MONITORING SYSTEM ALLOWING REAL-TIME DISPLAY OF SUMMARY VIEWS AND INTERACTIVELY DEFINED DETAILED VIEWS

(75) Inventors: Lichan Hong; Kenneth Charles Cox, both of Naperville, IL (US); Vladimir Nepustil; Paul Lawrence Richman, both of Boulder, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/358,596

(22) Filed: Jul. 21, 1999

(51) Int. Cl.[7] .................................................. G06K 3/00
(52) U.S. Cl. ........................................ 345/736; 345/772
(58) Field of Search ................................. 345/772, 771, 345/789, 828, 759, 762–763, 736, 734, 735, 730; 395/751–758

(56) References Cited

U.S. PATENT DOCUMENTS

| | | | | |
|---|---|---|---|---|
| 5,220,657 A | * | 6/1993 | Bly et al. ..................... | 345/759 |
| 5,790,797 A | * | 8/1998 | Shimada et al. ............. | 345/772 |
| 5,802,255 A | * | 9/1998 | Hughes et al. ................ | 395/75 |
| 5,929,855 A | * | 7/1999 | Benton et al. ............... | 345/772 |
| 6,020,889 A | * | 2/2000 | Tarbox et al. ............... | 345/736 |
| 6,141,680 A | * | 10/2000 | Cucchiara ................... | 709/201 |
| 6,243,452 B1 | * | 6/2001 | O'Shaughnessey et al. . | 345/736 |
| 6,256,643 B1 | * | 7/2001 | Cork et al. .................. | 707/205 |
| 6,317,727 B1 | * | 11/2001 | May ............................. | 705/37 |
| 6,330,005 B1 | * | 12/2001 | Tonelli et al. ............... | 345/735 |

* cited by examiner

Primary Examiner—Steven Sax

(57) ABSTRACT

A novel telephone call center agent monitoring and display system has a graphical user interface that allows a call center manager to automatically display a detailed multiple bar graph view of the status of particular agents currently engaged in agent activities specified by the manager for a duration also specified by the manager, the detailed view being linked to a composite view of the status of all agents being monitored by the manager. In the preferred embodiment, an agent status summary view displays in bar graph form, the collective statuses of all categories of agent status monitored by a call center manager corresponding to the longest time in the category for all of the agents monitored by the manager. If desired, the manager can "drill down" to a linked detailed view to display the duration of every agent currently in a chosen status category when the duration in that activity is within a time window chosen by the manager. Using a pointer device or simple keystrokes, the manger can generate a highlighted rectangular area on the summary view defining both the agent statuses of interest and minimum and maximum duration's of interest.

26 Claims, 3 Drawing Sheets

TELEPHONE CALL CENTER MONITORING SYSTEM ALLOWING REAL-TIME DISPLAY OF SUMMARY VIEWS AND INTERACTIVELY DEFINED DETAILED VIEWS

BACKGROUND OF THE INVENTION

1. Field of the Invention

The present invention relates to improvements in monitoring and managing agents and telephone call activity in telephone call centers. More particularly, the present invention relates to improved graphical user interfaces for monitoring and displaying the status of telephone call center agents.

2. Background of Related Art

Telephone call centers (or call centers) are networked groups of telephone operators or "agents" that provide customer service for telephone callers. Call centers can be in many different forms, from large Operator Service Systems (OSSs) under the control of telephone companies to smaller private ones such as corporate customer service centers and telemarketing groups.

An important function of a call center is to provide efficient service to all customers, including timely and satisfactory handling of all received calls. Prior art automatic call distribution (ACD) systems are software hardware hybrids for helping to efficiently switch incoming telephone calls to suitable and available operators. Notwithstanding the use of an ACD system, a call center has one or more human managers monitoring all or a designated portion of the calls received and handled by it.

Call center agents are often grouped according to "splits." A split can be a type of service provided during a telephone call or a type of skill possessed by an agent. For example, one split might handle credit card orders, another might handle customer complaints, and yet another split might handle technical support. A split manager monitors the calls received by a split and either assigns calls or overrides the ACD system when thought necessary. In addition to assigning calls or overriding the ACD, the manager often adjusts the parameters of the ACD to influence the ACD behavior. For example, the manager could assign some back-up agents to work in a busy ACD system.

To better understand the performance of a group of agents or the performance of an individual agent it is desirable to monitor agent statuses. Agents can be placed in one of the following categories, for example, according to their activity status: "available" (to receive a call), "ringing" (i.e., a ringing call is waiting be picked up by the agent), "after-call work" (ACW), "auxiliary work" (AUX); and "other" (a catchall for agent statuses that do not fit into the previous ones).

It is desirable for a manager to not only know the overall status of different categories (e.g., ACW, AUX, etc.) being monitored, but also to know which agents are in the categories of interest. In prior art systems, a manager may have the ability to generate a summary view summarizing the status of a group of agents. However, detailed information on particular agents must be gleaned from a separately generated list (not linked to the summary view) of all of the agents of the group.

While the summary view might indicate aberrations, eccentricities and abnormalities of the various status categories, the manager must painstakingly scroll through the detailed list to attempt to ascertain which agent or agents have statuses contributing to the abnormalities. This is an extremely inefficient way to view agent statuses. Further, the prior art provides no convenient way to quickly find information about a sub-group of agents who have been in selected status categories of interest during a temporal window of interest.

Thus, what is lacking but sorely needed in prior art call center monitoring systems is the ability to use the summary view of all agents being monitored as a guideline, and when necessary, leverage the summary view to interactively define a detailed view which is linked to the summary view and shows detailed information of individual agents who have been defined categories between a chosen minimum and maximum time period.

SUMMARY OF THE INVENTION

In view of the above-identified problems and limitations of the prior art, the present invention provides a method of displaying telephone call center agent status information via a graphical user interface, the method at least including the steps of:

providing a graphical summary view of agent status information summarizing the status of a set of telephone agents being monitored by a user according to a plurality of predefined agent status categories;

in response to user input, generating a highlighted area on the summary agent status view at least including the status categories and a temporal window of interest to the user;

based upon the highlighted area, automatically generating a graphical detailed view linked to the summary view, the detailed view having a graphical representation of each agent currently in the highlighted categories and temporal windows chosen by the user.

The present invention also provides a system for displaying telephone call center agent status information via a graphical user interface, the system at least including:

a summary view generator for generating a graphical summary view of agent status information summarizing the status of a set of telephone agents being monitored by a user according to a plurality of predefined agent status categories;

a highlight area generator coupled to the summary view generator and under the control of the user, adapted to generate a highlighted area on the summary agent status view at least including the status categories and a temporal window of interest to the user;

a detailed view generator coupled to the summary view generator and the highlight area generator, adapted to automatically generate a graphical detailed view linked to the summary view, the detailed view having a graphical representation of each agent currently in the highlighted categories and temporal windows chosen by the user.

BRIEF DESCRIPTION OF THE DRAWING FIGURES

Features and advantages of the present invention will become apparent to those skilled in the art from the description below, with reference to the following drawing figures, in which.

DESCRIPTION OF THE PREFERRED EMBODIMENTS

Figure 1:
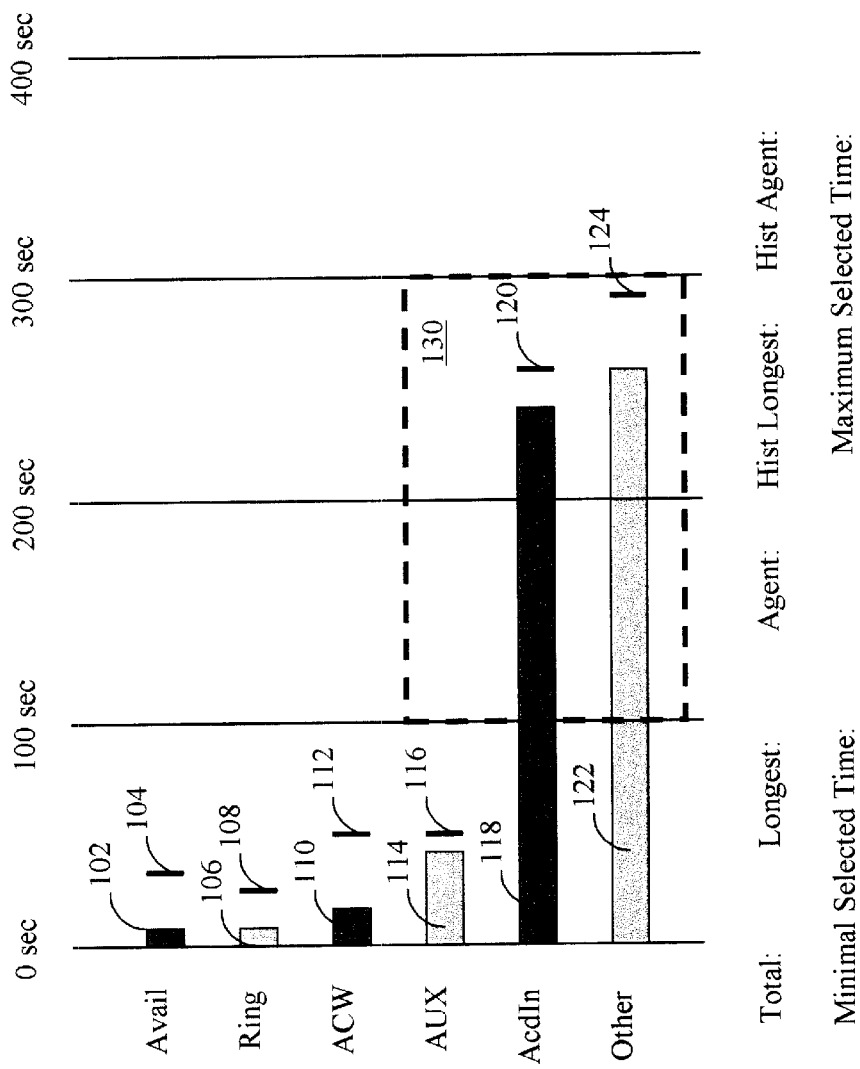
FIG. 1 is an example of an agent status summary view of the present invention.

FIG. 1 shows an agent status summary view 100 generated by the graphical user interface of the present invention. Several categories of agent status are shown, one into which each agent is placed. In the example shown, all of the agents monitored are in one of the following categories: "Available" 102; "Ringing" 106; ACW 110; AUX 114; AcdIn 118; or "Other" 122, a catch-all category for describing an agent's status when it does not fall into the aforementioned categories. It will be appreciated by those skilled in the art that the categories may be different from those shown in the example of FIG. 1. For ease of viewing and contrasting of information, the bars representing each category are of different colors.

The length of the bars corresponds to the longest amount of time any of the monitored agents has been in that category. Using the example of FIG. 1, the longest amount of time any of the agents has been in the AUX category 114 is approximately 40 seconds. The vertical marks 104, 108, 112, 116, 120 and 124 represent the historical maximum values of the corresponding categories. For example, these marks could represent the maximum value dating back to the beginning of a split manger's shift. It should be understood that whenever a current category maximum also establishes a new historical category maximum, vertical marks would be aligned with the right-most edge of the category bars. The summary view is updated in real time, as agents might constantly join and drop out of split activity status categories.

Figure 2:
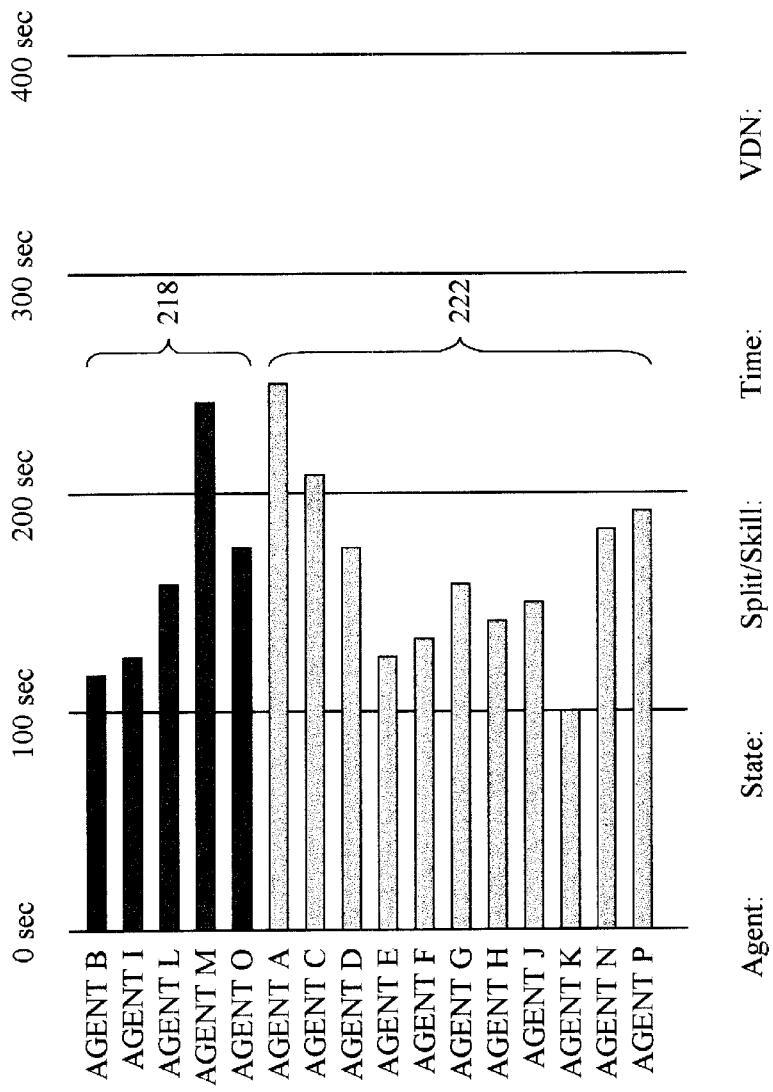
FIG. 2 is an example of an agent status detailed view of the present invention, which detailed view is linked to the aforementioned agent status summary view, and automatically generated and updated in real-time.

The user can establish a novel highlight area 130 to generate a linked detailed view 200 as shown in FIG. 2. In the preferred embodiment the color of the highlight area 130 is distinct from the background of the graph 100, such as purple against a white background. However, the highlight area can be defined by simply using an outline. The highlight area 130 can be generated via an input device such as a mouse, by "clicking" and "dragging" to establishing the dimensions of a rectangle.

The highlight area is sized by the user to include both the categories of interest and the window of time of interest. Upon the establishment of the highlight area 130, the system automatically "drills down" from the summary view to a linked detailed view 200 to automatically ascertain and display all of the agents in the chosen categories. In the example shown, the split manager is interested in a detailed display of agents who have been in the ACU, AcdIn and Other categories between 100 and 300 seconds.

The summary view 100 contains the following legends at the bottom corresponding to the information displayed and the highlight area: "Minimal Selected Time" corresponding to the lower limit of the temporal window graphically displayed as the leftmost edge of the highlight area 130; "Maximal Selected Time" corresponding to the upper limit of the temporal window graphically displayed as the rightmost edge of the highlight area 130; "Total" corresponding to the number of agents in the categories identified infra; "Longest" corresponding to the longest amount of time an agent is currently in one of highlighted categories; "Agent" identifying the agent referred to in "Longest;" "Hist Longest" corresponding to the historical maximum of the category identified in "Longest;" and "Hist Agent" identifying the agent referred in "Hist Longest."

It is apparent from FIG. 1 that no agents in the AUX category fall within the temporal window chosen. Hence, the agents represented in linked, detailed view of FIG. 2 are only in the AcdIn and Other categories. In the preferred embodiment, the visual characteristics of the agent status bars in FIG. 2 are consistent with the visual characteristics of the categories to which they pertain. Accordingly, the dark bars in FIG. 2 represent the agents currently in the AcdIn category (and in the chosen temporal window), and are the same in appearance as the summary bar 118 representing the AcdIn category in the summary view of FIG. 1. The light bars in FIG. 2, then, represent the agents currently in the "Other" category (and in the chosen temporal window), and are the same in appearance as the summary bar 122 representing the "Other" category in the summary view of FIG. 1.

It will be appreciated by those skilled in the art that just as the category bars in FIG. 1 change in real time, the bars in FIG. 2 also change in real time, constantly lengthening and shortening where appropriate, and even disappearing when an agent's status no longer falls within the parameters established by the highlight area 130. Further, new bars are added to the detailed view 200 when new agents meet the criteria set by the highlight area.

If desired, the manager can move a screen pointer (via a mouse, etc.) to the bar representing an agent of interest in FIG. 2 to automatically display the details of the agent's status (at the bottom of the bar graph). Hence, the areas labeled "Agent," "State," "Split/Skill," "Time," and "VDN," where VDN is the vector directory number. In the example shown, Agent M has been in the AcdIn category the longest, and the length of Agent M's status bar is therefore equivalent to the length of the AcdIn summary bar in FIG. 1. Similarly, Agent A has been in the "Other" category the longest, and the length of Agent A's status bar is also equivalent to the length of the "Other" summary bar in FIG. 1.

Figure 3:
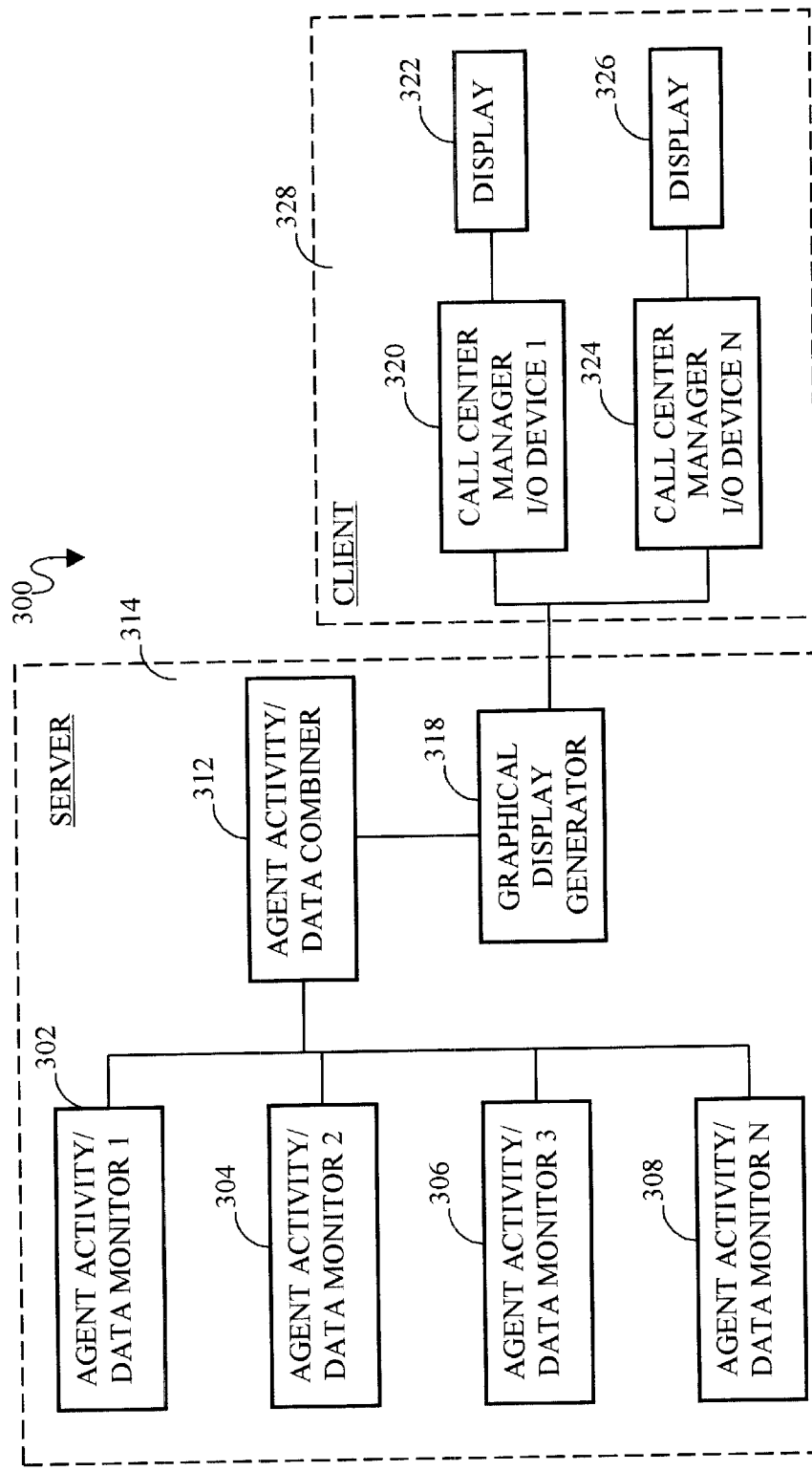
FIG. 3 is a schematic block diagram of a system used to generate the agent status summary views and the linked agent status detailed views of the present invention.

A basic schematic diagram 300 of the present-inventive system is shown in FIG. 3. The system 300 is a networked client-server system.

One or more servers 314, acting as system controllers, cause the collection of agent data via several agent activity/data monitors (302–308 in the figure), that dynamically monitor and output data reflective of the agent status of each assigned call center split. The system 300 is scaleable, and reconfigures itself to establish any number of agent monitors, according to design and operation choice. The server also causes the agent data from each agent monitor to be combined by an agent activity/data combiner 312. The combiner 312 combines the agent data from several agent activity/data monitors and passes it to a graphical display generator 318.

The graphical display generator 318 converts the data received from the combiner 312 to a summary view such as the one shown in FIG. 1. The summary view is transmitted to one of the clients (328) of the system, including user/split manager I/O devices (320, 324, etc.) for display on screens and the like (322, 326, etc.).

During the operation of the call center, a split manager can request to "drill-down" to a detailed view such as the one shown in FIG. 2. By clicking and dragging the mouse in the summary view 100, the manger defines a highlighted area 130. The highlighted area definition is transmitted from the client to the graphical display generator 318 in the server. The graphical display generator 318 extracts the subset of agent data defined by the highlight area and converts the data into a detailed view such as the one shown in FIG. 2. The detailed view is then transmitted to the client for display on screens and the like (322, 326, etc.).

Variations and modifications of the present invention are possible, given the above description. However, all variations and modifications which are obvious to those skilled in the art to which the present invention pertains are considered to be within the scope of the protection granted by this Letters Patent.

For example, the present invention can be used to monitor any group of agents, whether all are from the same split different splits, or an entire call center.

Further, the present invention is not limited to telephone call centers, but is applicable to any type of customer contact center using any type of telecommunication means including but not limited to telephones, on-line communication devices such as computers, radio frequency transceivers, and interactive television. The contact method is not limited to telephone calls, but may be in the form of other electronic means, including e-mail and other digital messaging. Further, "agent" is hereby broadly defined to include any sort of organic or inorganic entity or instrumentality capable of processing customer communication needs.

What is claimed is:

1. A method of displaying customer contact center agent status information via a graphical user interface, said method comprising the steps of:
   providing a graphical summary view of agent status information summarizing the status of a set of agents being monitored by a user according to a plurality of predefined agent status categories;
   in response to user input, generating a highlighted area on the summary agent status view comprising the status categories and a temporal window of interest to the user;
   based upon the highlighted area, automatically generating a graphical detailed view linked to said summary view, said detailed view having a graphical representation of each agent currently in the highlighted categories and temporal windows chosen by the user.

2. The method in claim 1 wherein the highlighted area is substantially in the form of a variably dimensioned quadrilateral.

3. The method in claim 1 wherein said summary view comprises bar graphs, with a separate bar representing each agent status category.

4. The method in claim 1 wherein said detailed view comprises bar graphs, with a separate bar representing the status of each agent currently in the highlighted categories and temporal windows chosen by the user.

5. The method in claim 1 wherein said summary view comprises bar graphs, with a separate bar representing each agent status category, and said detailed view comprises bar graphs, with a separate bar representing the status of each agent currently in the highlighted categories and temporal windows chosen by the user.

6. The method in claim 3 wherein contiguous bars have contrasting visual characteristics.

7. The method in claim 5 wherein contiguous bars in said summary view have contrasting visual characteristics.

8. The method in claim 7 wherein the visual characteristics of each bar in said detailed view are consistent with the summary view visual characteristics of the bar representing the status category to which the bar in the detailed view pertains.

9. The method in claim 5 wherein the bars in said detailed view are grouped according to the status categories to which they pertain.

10. The method in claim 8 wherein the bars in said detailed view are grouped according to the status categories to which they pertain.

11. The method in claim 1 wherein said summary view includes for each agent status category, historical maximum indicia for indicating the historical maximum value of the category.

12. The method in claim 5 wherein said summary view includes for each agent status category, historical maximum indicia for indicating the historical maximum value of the category.

13. The method in claim 10 wherein said summary view includes for each agent status category, historical maximum indicia for indicating the historical maximum value of the category.

14. A system for displaying customer contact center agent status information via a graphical user interface, said system comprising:
   a summary view generator for generating a graphical summary view of agent status information summarizing the status of a set of agents being monitored by a user according to a plurality of predefined agent status categories;
   a highlight area generator coupled to said summary view generator and under the control of said user, adapted to generate a highlighted area on the summary agent status view comprising the status categories and a temporal window of interest to the user;
   a detailed view generator coupled to said summary view generator and said highlight area generator, adapted to automatically generate a graphical detailed view linked to said summary view, said detailed view having a graphical representation of each agent currently in the highlighted categories and temporal windows chosen by the user.

15. The system in claim 14 wherein the highlighted area is substantially in the form of a variably dimensioned quadrilateral.

16. The system in claim 14 wherein said summary view comprises bar graphs, with a separate bar representing each agent status category.

17. The system in claim 14 wherein said detailed view comprises bar graphs, with a separate bar representing the status of each agent currently in the highlighted categories and temporal windows chosen by the user.

18. The system in claim 14 wherein said summary view comprises bar graphs, with a separate bar representing each agent status category, and said detailed view comprises bar graphs, with a separate bar representing the status of each agent currently in the highlighted categories and temporal windows chosen by the user.

19. The system in claim 17 wherein contiguous bars have contrasting visual characteristics.

20. The system in claim 18 wherein contiguous bars in said summary view have contrasting visual characteristics.

21. The system in claim 20 wherein the visual characteristics of each bar in said detailed view are consistent with the summary view visual characteristics of the bar representing the status category to which the bar in the detailed view pertains.

22. The system in claim 18 wherein the bars in said detailed view are grouped according to the status categories to which they pertain.

23. The system in claim 21 wherein the bars in said detailed view are grouped according to the status categories to which they pertain.

24. The system in claim 14 wherein said summary view includes for each agent status category, historical maximum indicia for indicating the historical maximum value of the category.

25. The system in claim 19 wherein said summary view includes for each agent status category, historical maximum indicia for indicating the historical maximum value of the category.

26. The system in claim 23 wherein said summary view includes for each agent status category, historical maximum indicia for indicating the historical maximum value of the category.

* * * * *